March 27, 1956
A. S. PARKS
2,739,664
METHODS OF AND MEANS FOR DEHYDRATING AND PROCESSING STREAMS
Filed July 10, 1953
3 Sheets-Sheet 2
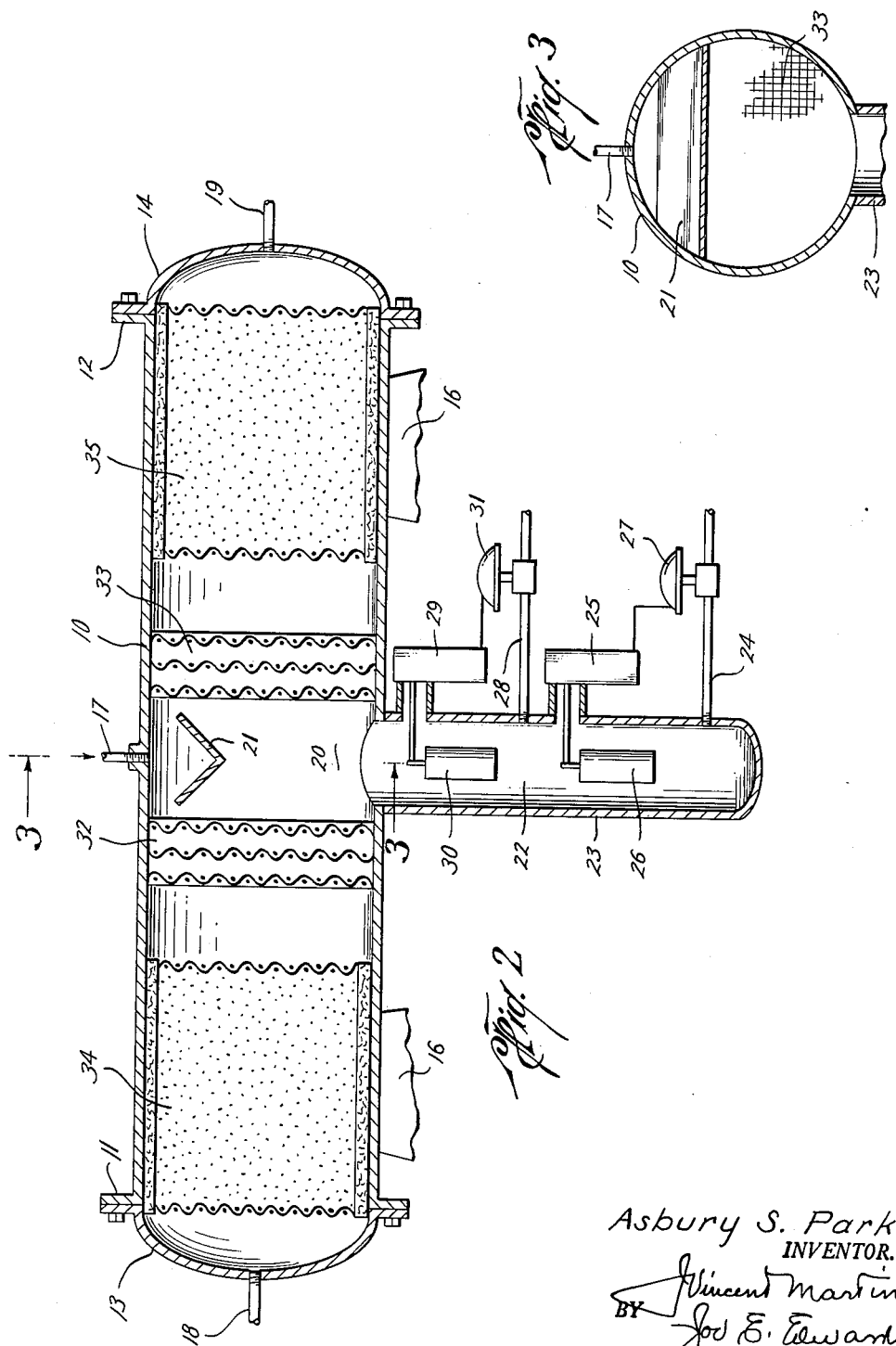
Asbury S. Parks
INVENTOR.
BY Vincent Martin
Joe E. Edwards
B. R. Pravel
ATTORNEYS March 27, 1956  A. S. PARKS  2,739,664
METHODS OF AND MEANS FOR DEHYDRATING AND PROCESSING STREAMS
Filed July 10, 1953  3 Sheets-Sheet 3

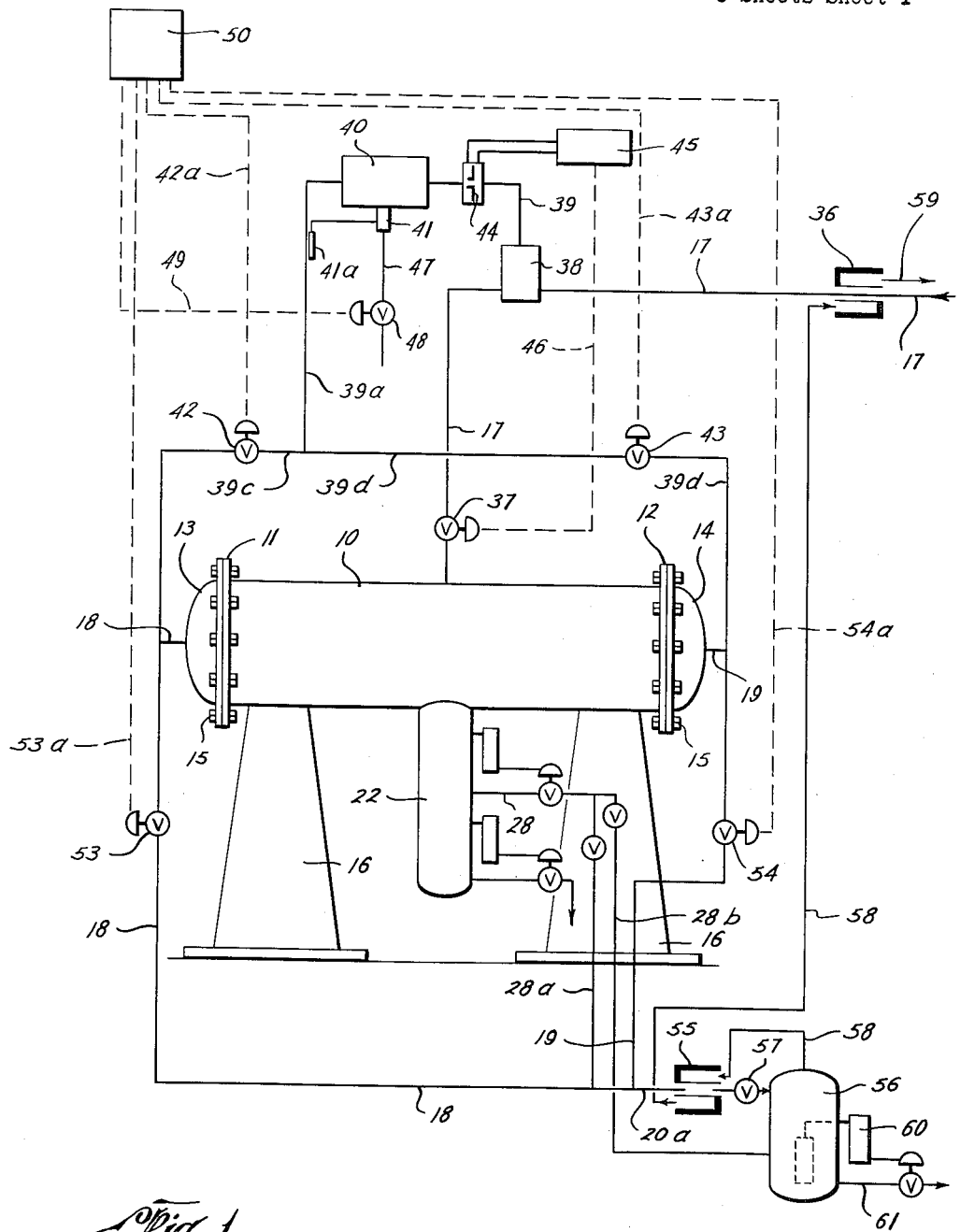

Asbury S. Parks
INVENTOR.

BY Vincent Martin
Joe E. Edwards
B. R. Travel
ATTORNEYS

United States Patent Office 2,739,664
Patented Mar. 27, 1956

2,739,664

METHODS OF AND MEANS FOR DEHYDRATING AND PROCESSING STREAMS

Asbury S. Parks, Houston, Tex.

Application July 10, 1953, Serial No. 367,240

33 Claims. (Cl. 183—4.7)

This invention relates to new and useful improvements in methods of and means for dehydrating and processing streams.

The invention is particularly adapted for use in dehydrating natural gas or gas streams flowing from high pressure gas-condensate or "distillate wells." As used herein the term "gas stream" is meant to include a stream which is primarily gaseous but which may contain hydrocarbon liquids and water in either or both the liquid or vapor phase.

Various methods and systems of dehydrating gas streams have heretofore been in general use, and one such method involves the use of a dry adsorbent which adsorbs the moisture from the gas stream. Such adsorbents, being desiccants, are capable of adsorbing certain quantities of moisture before becoming saturated but following saturation are further ineffective until regenerated; such regeneration is usually accomplished by applying heat to the desiccant to drive off the moisture. The most practical manner of employing dry desiccant for accomplishing a dehydration of the gas stream has been to provide two separate bodies of desiccant so that one body may be employed in a drying cycle while the other body is in a regeneration cycle. In accordance with prior practice, these two bodies of desiccant have always been housed in two separate and distinct vessels, and in addition it has been necessary to provide an inlet liquid scrubber which separates out liquid fractions, a heat exchanger and a scrubber on the outlet stream of the regeneration gas to collect the water and hydrocarbon liquids which have been condensed in the heat exchanger. These various vessels obviously comprise a rather complicated plant unit which, together with the automatic or manual valving required to control flow, increases the expense and makes the assembly inapplicable for use on a single well. As a result, the usual dehydration plant has comprised a large plant unit capable of handling large capacities so that one unit may be employed for dehydrating the gas from many wells. This arrangement presents certain disadvantages in that the gas streams must be conducted relatively long distances through pipe lines to the dehydrating plant so that pipe line problems, such as excessive corrosion, are created because of the flow of the gas stream containing the liquid fractions through said lines. As is well known, it is desirable to remove the liquids, particularly water, from the gas stream as soon as possible after the stream is conducted from the well and a unit which may be mounted adjacent the well head will accomplish this result.

Not only is the plant unit now in general use not economically feasible for use on a single well, because of its many vessels, scrubber, heat exchangers and the like, but also it is economically impractical to construct the unit for use within the higher pressure ranges; obviously, all of the various vessels and other apparatus comprising the plant unit would have to be manufactured to withstand the higher pressures and to so construct the same would increase the cost beyond economic limits.

It is one object of the present invention to provide an improved method and apparatus for dehydrating and processing a gas stream which is extremely simple in operation and design, employs a minimum number of vessels and controls, and thereby minimizes not only original cost but also expense of operation.

An important object of the invention is to provide an improved method wherein a pair of desiccant packs are disposed in a unitary apparatus, with means for directing the flow in such manner that one of said packs is employed in a drying cycle while the second pack is undergoing regeneration; the arrangement making it possible to employ the invention on an individual well and to carry out the method at relatively high pressures which enhances separation of the liquids and liquefiable fractions from the gas.

Another object is to provide an improved method for dehydrating a main gas stream which includes directing said main stream into a chamber wherein liquids are separated, then directing the stream through a desiccant pack to remove certain adsorbable fractions therefrom, and conducting a warm regenerating gas stream which has been utilized to regenerate the second desiccant pack into said inlet chamber to admix with and contact the relatively cool and considerably larger volume main gas stream to thereby effect condensation of the liquids within the regenerating stream.

A further object is to provide a dehydrating apparatus of the character described which employs a unitary vessel arrangement within which the various necessary operations are carried out; said unitary vessel arrangement functioning as the equivalent of the usual double desiccant pack towers, heat exchanger, scrubbers and other equipment generally employed, whereby a substantial economic advantage is obtained.

Another object is to provide an apparatus of the character described, wherein the warm regenerating gas which has been employed for regenerating one of the desiccant packs is admixed with the relatively cool main gas stream so that cooling of the regenerating stream is effected by direct contact of said regenerating stream with the main stream.

Still another object of the invention is to provide an improved apparatus wherein the unitary vessel assembly contains a double desiccant pack with an inlet intermediate the two packs and also wherein said vessel assembly has a liquid receiving chamber in communication with the inlet chamber, whereby separated liquids may be received in the liquid receiving chamber which contains the usual and necessary level controllers for controlling the discharge of such liquid.

A still further object is to provide an apparatus wherein the main gas stream is alternately directed through the desiccant packs and also wherein a relatively small portion of the incoming gas is conducted through a heating means and is utilized as the gas for regenerating the desiccant packs; the apparatus including suitable control means so that the operation of the apparatus is completely automatic in changing the direction of flow of the gas streams through the desiccant packs of said apparatus.

Another object is to provide an apparatus of the character described which may incorporate all of the necessary elements in a single vessel or which may provide a single unitary vessel structure with the desiccant packs being formed in chambers which, although distinct in themselves, are so connected to the remaining units as to provide a single assembly.

Still another object is to provide a method and apparatus of the character described wherein the regenerating gas stream, after passing through the desiccant pack which it is regenerating, may be cooled by a suitable auxiliary means prior to its contact with the relatively cool incoming main gas stream.

The construction designed to carry out the invention will be hereinafter described together with other features of the invention.

The invention will be more readily understood from a reading of the following specification and by reference to the accompanying drawings, wherein an example of the invention is shown, and wherein:

Figure 1 is an elevation of an apparatus constructed in accordance with the invention for carrying out the improved method and diagrammatically illustrating the various controls, valves, etc.;

Figure 2 is a horizontal cross-sectional view of a unitary vessel which contains the double desiccant pack;

Figure 3 is a horizontal cross-sectional view taken on the line 3—3 of Figure 2;

Figure 4:
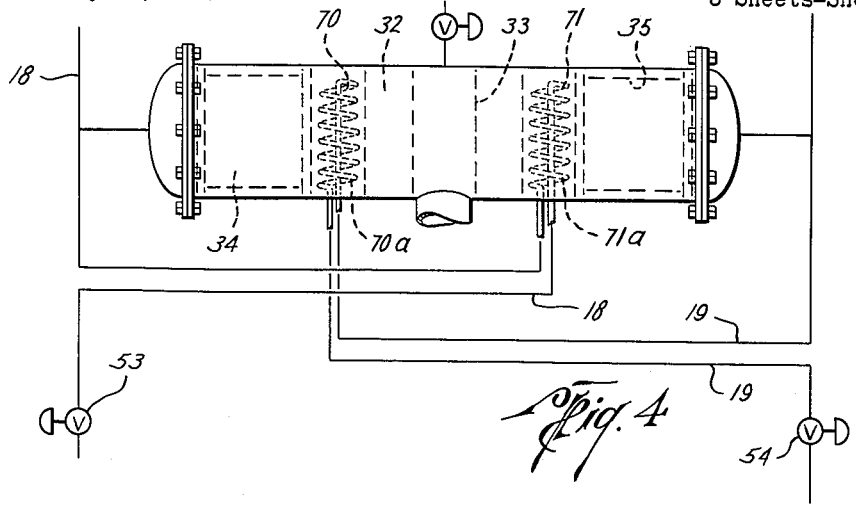
Figure 4 is an elevation of the vessel illustrating a modification of the invention.

In the drawings the numeral 10 designates a cylindrical vessel or tank which is formed with annular flanges 11 and 12 at opposite ends thereof. Flanged closure members or plates 13 and 14 are adapted to be secured by bolts 15 to the flanges 11 and 12, respectively, and function to close the end of said vessel. The vessel is indicated as being disposed in a horizontal plane and may be supported in any desired manner such as by vertical supports or legs 16. An inlet conductor 17 which conducts the main gas stream which is to be dehydrated or processed is connected in the wall of the tank or vessel 10 at a point intermediate the ends of said vessel, it being preferable that said conductor be disposed at substatnially the central portion of the vessel. An outlet line 18 extends from the closure 13 while a similar outlet line 19 extends from the closure 14. As will be hereinafter described, flow through the vessel or tank is alternately from the inlet 17 to one or the other of the outlets 18 or 19; when flow is from the inlet conductor 17 to the outlet 18, the outlet line 19 functions as an inlet for a regenerating gas stream. Similarly, when flow is from the inlet line 17 to the outlet line 19, the line 18 functions as the inlet for a regenerating gas stream.

The inlet conductor 17 discharges into a central chamber 20 which is formed within the central portion of the tank or vessel and within this chamber adjacent the discharge end of the conductor is a generally V-shaped baffle or deflector element 21. This baffle or deflector constitutes a conventional flow breaker and functions to encourage the separation of any liquids or liquid fractions from the incoming gas stream. The separated liquids precipitate downwardly within the chamber 20 and into a liquid receiving area 22 which is formed by a liquid leg. The liquid leg is preferably in the form of a cylindrical casing or housing 23 which has its upper end communicating with the inlet chamber 20 whereby a free passage of liquid from the chamber into the area 22 may occur. A water discharge pipe 24 extends from the lower end of the housing 23 and a liquid level controller 25 which includes a float 26 is adapted to control operation of a motor valve 27 which is mounted in the discharge pipe to thereby control the interface between water and liquid hydrocarbons in the liquid area 22. The details of the motor valve and the level controller are not illustrated since these parts are of well known construction.

A liquid hydrocarbon discharge pipe 28 extends from the liquid receiving leg or housing 23 at a point intermediate the height thereof and is utilized to withdraw the liquid hydrocarbons from said liquid leg. A liquid level controller 29 which includes a float controls operation of a motor valve 31 which is mounted in the liquid hydrocarbon discharge pipe 28. It is evident that as the liquids accumulate in the liquid leg formed by the area 22, the level of such liquids is maintained through the liquid level controllers and said liquids are automatically discharged through the outlet pipes 24 and 28.

The gas stream which contains liquid fractions and liquids enters the vessel or tank through the inlet conductor 17 and initially strikes the flow breaker or baffle 21 so that the liquids and liquid fractions are separated from the gas stream. The separated liquids precipitate downwardly in the chamber 10 while the gas is directed longitudinally of the vessel in one direction or the other, as will be explained. Within the interior of the vessel and adjacent the chamber 20 are a pair of coalescing packs 32 and 33 which function as scrubbers and as the gas stream flows from the chamber 20, said stream passes through one or the other of said packs, whereby additional liquid is removed from the stream; this removed liquid flows downwardly and escapes into the liquid leg from which it is ultimately discharged through the pipes 24 and 28.

Beyond the coalescing pack 32 is a desiccant pack 34 which is composed of a dry adsorbent material and when flow is from the inlet conductor 17 to the outlet line 18, the gas stream passes through the desiccant pack 34 which functions to adsorb and thereby remove the moisture from said gas stream. In the opposite end of the vessel and beyond the coalescing pack 33 is a second desiccant pack 35 which includes a dry adsorbent and which is substantially of the same construction as the pack 34. When the flow is from the inlet conductor 17 to the outlet line 19, the gas stream is caused to pass through the desiccant pack 35 which in the well known manner removes moisture from the stream.

Desiccant packs of adsorbent material have been found efficient in dehydrating gas streams but obviously when the pack becomes saturated, it is necessary to shut off flow through the pack and effect a regeneration of the desiccant. This may be accomplished in various ways but usually is effected by circulating a warm medium, such as gas, through the saturated desiccant pack to thereby thoroughly dry and thus regenerate said pack. The present apparatus is arranged so that flow of the main gas stream entering through the inlet conductor may be directed alternately through the desiccant packs 34 and 35 so that one of said desiccant packs is employed in a drying cycle to remove moisture from the main gas stream being dehydrated while at the same time the other pack is undergoing regeneration.

Referring to Figure 2 which illustrates the vessel 10 and its associate parts, it will be presumed that the incoming main gas stream is first directed through the desiccant pack 34. In this case the flow of the incoming stream will be from the conductor 17 and then through the coalescing pack 32, desiccant pack 34 and outwardly through line 18. The incoming gas stream which is under a relatively high pressure and which has liquids and liquid fractions contained therein first strikes the deflector baffle or breaker 21, and this encourages separation and precipitation of the liquids and liquid fractions from said stream. The liquids precipitate downwardly into the liquid leg or area 22 from which they are subsequently removed as controlled by the operation of the liquid level controllers. The well stream will contain water as well as hydrocarbon liquid fractions and by providing the liquid leg with the two discharge pipes 24 and 28, it is possible to withdraw the water and the hydrocarbons separately from each other.

The gas stream, after flowing around the baffle 21, passes from the chamber 20 through the coalescing pack 32 which functions to knockout or remove additional liquid fractions and thereafter, said stream flows through the desiccant pack 34 which adsorbs the remaining moisture from the stream, the dry gas being discharged through the outlet line 18.

At the same time that the main gas stream being dehydrated or processed is flowing from the inlet conductor 17 through chamber 20, coalescing pack 32 and desiccant pack 34 to the line 18, a regenerating gas stream which has been heated by suitable heating means is introduced through the line 19 and is passed in a direction inwardly of the vessel through the desiccant pack 35 which has been saturated in a previous drying cycle. The hot regenerating gas functions to dry out or regenerate the desiccant in pack 35 by picking up the moisture therefrom. After passing through the pack 35, the regenerating gas stream which is now more or less saturated is directed into the chamber 20 where it intimately contacts and admixes with the incoming main gas stream from the inlet conductor 17. The incoming main gas stream is relatively cool as compared to the regeneration stream and a heat exchange occurs by reason of the direct contact and intimate mixing of the two streams. Obviously, the regeneration stream which is relatively small by volume as compared to the main gas stream is cooled and this reduction in temperature results in condensing the water and other liquids present in the regenerating stream. Since this condensation occurs in the chamber 20 the condensed liquids precipitate from the chamber 20 into the liquid leg or area 22.

After the regenerating gas stream has been de-saturated due to the condensation and precipitation of water therefrom, said regenerating gas admixes with the main gas stream and is conducted with said main gas stream through the coalescing pack 32 and desiccant pack 34 and is ultimately discharged from the vessel along with the main gas stream through the line 18.

It will be evident that there may be a slight increase in the temperature of the main gas stream by its admixture with the warmer regenerating stream within chamber 20 so that the mixture stream passing through the desiccant pack 34 has its water content slightly increased. However since the regenerating gas stream is of a much lesser volume than the main gas stream, the slight increase in water carrying capacity of the resultant mixed stream can be readily compensated for by reducing the time of the drying cycle through each desiccant pack.

When the desiccant pack 34 becomes saturated, the flow is shifted so that the main gas stream flows from the inlet conductor 17 to outlet line 19 and in such event the line 18 becomes the inlet for the regenerating gas stream. Upon shifting of the flow, the main gas stream enters chamber 20 from the inlet conductor 17 and after contact with the deflector or breaker element 21 passes through the coalescing pack 33 and then through the regenerated desiccant pack 35. Simultaneously therewith the hot regenerating gas stream is introduced through line 18 and flows through the desiccant pack 34 to regenerate the same. As has been above described, the saturated hot regenerating gas stream which has picked up the moisture from the desiccant pack 34 intimately contacts and becomes admixed with the relatively cool incoming main gas stream in the chamber 20 to produce a heat exchange between the streams and thereby utilize the relatively cool large volume main stream to lower the temperature of the hot regenerating small volume stream. Cooling of the regenerating gas causes a condensation of the water and liquids in the regenerating stream so that said water and liquids precipitate downwardly into the liquid leg. Thereafter, the mixed stream formed by the admixture of the main gas stream and the regenerating stream flows through the coalescing pack 33 and desiccant pack 35 after which the dry gas is discharged through outlet 19.

From the foregoing, it will be seen that the complete process of dehydrating the main gas stream, as well as regenerating one desiccant pack while the other is on a drying cycle, is carried out in a single unitary vessel assembly. One desiccant pack is employed for the purpose of removing the moisture from the gas while the other desiccant pack is being regenerated. The regenerating gas stream which is employed for regenerating one of the packs is brought into intimate contact with the incoming main gas stream and essentially all of the water vapor carried by the regenerating stream is condensed to liquid and is separated in the chamber 20. The resulting mixture of the main gas stream and the regenerating gas stream then passes through the second desiccant pack where normal adsorption of water and hydrocarbons occurs. It is evident that the function of a heat exchanger occurs in the chamber 20 where the gas streams are admixed and said chamber, together with the liquid leg, acts as a separator. The dry gas is removed from the vessel through either line 18 or 19, depending upon the direction of flow while the liquids are removed in a conventional manner by the use of the liquid level controllers 25 and 29.

By providing the unitary vessel assembly which contains both desiccant packs, the vessel may be made relatively small so as to withstand and be operable under high pressure. As is well known, the water vapor carrying capacity of a gas stream is less under the high pressure ranges so that separation of water and liquid fractions may be more rapidly accomplished. Since only a single vessel structure is required in the present apparatus, it is possible to construct the apparatus as a unitary assembly for use on a single well which makes possible the dehydration of the gas prior to its passage into a pipe line, whereby pipe line difficulties which are caused by the presence of water are obviated. As has been noted, prior practices have required the use of a double desiccant tower, together with heat exchangers, water knockouts, scrubbers and the like, all of which resulted in large plants not economically feasible for individual well head installation or for high pressure operation.

The control of the flow of the gas streams and the change in the direction of flow of said streams to alternately change from the drying cycle to the regenerating cycle in each desiccant pack may be accomplished in any desired manner. However, in Figure 1 an arrangement is illustrated which will automatically control the operation to effect a shifting of flow from one cycle to the other, and as shown, the inlet conductor 17 may extend from any suitable main gas source such as a gas-condensate well. It may be desirable to cool the main gas stream flowing through the conductor in which case a heat exchanger 36 may be connected therein in advance of the vessel 10. A valve 37 which is preferably motor-actuated is connected in the conductor 17 and functions to restrict flow through said conductor in a desired manner.

It is desirable to utilize a portion of the gas from the main gas stream flowing through said conductor as the regeneration gas stream and for this purpose a liquid pot or chamber 38 is connected in the conductor 17 and has a line 39 extending therefrom. The purpose of the chamber 38 is to separate any free liquids from that portion of the gas which flows through line 39. The line 39 extends through a heater 40 which is fired by a burner 41 and the discharge pipe 39a from the heater connects with conductors 39c and 39d which are connected to the outlets 18 and 19, respectively, of the vessel. A valve 42 is mounted in the conductor 39c while a similar valve 43 is mounted in the conductor 39d, these valves being preferably motor-actuated and being adapted to control flow through said conductors. That portion of gas which is withdrawn from the main inlet conductor 17 provides the regenerating gas stream and said stream is heated by means of the heater 40 and is then directed either through the conductor 39c or the conductor 39d to the outlets 18 and 19 in the ends of the vessel 10. Selective flow in either direction through conductors 39c and 39d is controlled by opening and closing of the valves 42 and 43.

It is desirable that the flow of the hot regenerating gas stream be held substantially constant and for this purpose an orifice plate 44 having a fixed orifice therein is connected in line 39. The differential pressure across this orifice actuates a rate controller 45 which is of usual construction. The output pilot pressure from the rate controller 45 is conducted through line 46 and actuates the motor valve 37 which is mounted in the main inlet conductor 17. The valve 37 functions to restrict flow through the main inlet conductor so as to maintain a desired back pressure in the chamber 38 and thereby effect a predetermined flow of gas through the line 39. A variation in the volume of gas flowing through line 39 results in a variation in pressure differential across the orifice plate 44 with a resultant adjustment of motor valve 37, such adjustment being effected through the rate controller 45. With this arrangement it is evident that a substantially constant volume of gas is directed through line 39 for regeneration purposes.

Fuel for the burner 41 of the heater is supplied by a fuel supply line 47 which has a motor valve 48 connected therein. The motor valve has a control line 49 extending therefrom and the valve operation is controlled by a time cycle controller and burner shut-off mechanism 50 which may be of any suitable construction. The burner 41 may be thermostatically controlled by a thermostatic element 41a which is mounted in the outlet pipe 39a extending from the heater. The element 41a is responsive to the temperature of the regenerating gas stream discharging from the heater and automatically adjusts the burner to maintain the regenerating gas stream at the desired temperature.

For controlling the discharge of the dry gas from the outlets 18 and 19, a motor valve 53 is connected in outlet line 18 while a similar motor valve 54 is connected in line 19. A pilot pressure line 53a extends from the valve 53 to the time cycle controller 50 and a similar pressure line 54a extends from the valve 54 to said controller, whereby the valves 53 and 54 are opened and closed on a predetermined time cycle. The time cycle controller 50 also controls the actuation of the motor valves 42 and 43 in the conductors 39c and 39d, through pressure lines 42a and 43a. When the valves 42 and 54 are closed, valves 43 and 53 are open and the main gas stream entering the vessel 10 through inlet conductor 17 is discharged through outlet 18; at the same time, the hot regenerating gas is directed through the branch conductor 39c and is introduced into the vessel through line 19. Upon actuation of the valves by the time cycle controller, the valves 43 and 53 are closed while the valves 42 and 54 are opened, thereby switching the flow through the vessel 10 in the manner hereinbefore described.

The dry gas which is conducted from either line 18 or 19 may be delivered directly to a pipe line but in some instances it may be desirable to take the gas through an additional separating step. In such case the lines 18 and 19 may join into a common conductor 20a which after passing through a heat exchanger 55 conducts the gas to the upper end of a separator vessel 56; a choke or restricting valve 57 may be disposed adjacent the inlet to the separator vessel 56 to effect a pressure reduction which results in a decrease in temperature of the gas. Such temperature decrease condenses further liquid fractions from the gas stream and the cold dry gas is conducted from the separator through a line 58. This cold gas may be passed through the heat exchanger 55 and then through the heat exchanger 36, finally discharging through a discharge line 59 extending from the latter heat exchanger. A suitable level controller 60 mounted in the separator vessel controls discharge of the liquids through a discharge line 61 extending from the lower end of the vessel 56.

The hydrocarbon liquids which are conducted from the liquid leg 22 of the vessel through the discharge pipe 28 may be directed either through a branch 28a which has connection with the common conductor 20a leading to the seperator vessel 56, or such liquids may be taken through a branch 28b directly to the lower portion of said separator vessel. Of course, if the separator 56 is not employed, the hydrocarbon liquids from discharge pipe 28 may be conducted to any desired point.

In summarizing the operation, the gas stream which is to be dehydrated or processed and which may be conducted from any source but which is preferably conducted from a well is directed into the central chamber 20 of the separator vessel 10 through the inlet conductor 17. Assuming that this main gas stream is flowing through the coalescing pack 32 and desiccant pack 34 a separation of the liquids and a dehydration of the gas occurs so that dry gas is discharging from the vessel through the line 18. At this time the time cycle controller has operated the control valves and valve 42 in the branch conductor 39c and valve 54 in line 19 are closed while valve 43 in branch conductor 39d and valve 53 in line 18 are open. Thus, at the same time that the main gas stream is flowing through the desiccant pack 34, a hot regenerating gas stream is flowing from the heater through lines 39a, 39d and 19 and is directed through the second desiccant pack 35 in the manner heretofore described. The volume of the hot regenerating gas stream is maintained substantially constant through the orifice plate 44, rate controller 45 and motor valve 37.

When a predetermined time has elapsed and the desiccant pack 34 is saturated, then the time cycle controller 50 acts to operate valve 42, 43, 53 and 54. This operation opens valves 42 and 54 and closes valves 43 and 53, thereby switching the direction of flow of the main gas stream and of the regenerating gas stream through the vessel 10. In such case the main gas stream flows through the regenerated desiccant pack 35 and is discharged through line 19, while the hot regenerating gas flows through branch conductor 39c and enters the vessel through line 18, flowing through desiccant pack 34 to regenerate the same. When the time cycle has been completed, the controller 50 again actuates valves 42, 43, 53 and 54 to again reverse the flow through the vessel.

The vessel 10 comprises a unitary apparatus which permits the main gas stream to be passing through a drying cycle as it flows through one desiccant pack, while the second desiccant pack is being regenerated. The free liquids and liquid fractions present in the gas are removed in the separating chamber 20 and are precipitated into the liquid leg from which they are removed in the conventional manner through the discharge pipes 24 and 28. Since only a single vessel structure is employed, said vessel structure may be economically constructed to operate under high pressures which facilitates dehydration of the gas. Also, since the major portion of the liquids are separated out in the chamber 20, it is possible to employ relatively small desiccant packs and still provide maximum capacity for the weight and size of the overall apparatus.

A modified form of the invention is illustrated in Figure 4. In some instances it may be desirable to cool the hot regenerating gas stream after it passes through the desiccant pack and prior to its passage into the central chamber 20 where it contacts the incoming main gas stream. In such case a heat exchanger 70 may be disposed between the desiccant pack 34 and the coalescing pack 32 and a similar heat exchanger 71 may be disposed between the desiccant pack 35 and the coalescing pack 33. It will be evident that when the desiccant pack 34 is on a regeneration cycle, the hot regenerating gas stream, after passing through the desiccant pack 34, will contact and pass through the cooling coils of the heat exchanger 70. This will effect an initial cooling of the hot regenerating gas stream which has become saturated and will encourage condensation of water and other liquids. Thereafter, the regenerating stream will be directed into the central chamber 20 where it will be admixed with the main gas stream and further cooled in the manner hereinbefore described. Similarly, when the desiccant pack 35 is on the regeneration cycle, the hot regenerating stream will contact the heating coil of the heat exchanger 71 to be precooled prior to its passage into the central chamber 20.

Although the cool medium which is circulated through the heat exchangers 70 and 71 may be derived from any source, it is desirable to employ the relatively cool dry gas which is discharging from the drying cycle of the vessel. In such instance, the outlet line 18 will be connected to the coil 71a of the heat exchanger 71 so that the relatively cool dry gas which is discharging from the vessel through line 18 when the desiccant pack is on a drying cycle is passed in heat exchange relationship with the hot regenerating gas. The coil 70a of the heat exchanger 70 may have the outlet line 19 connected therewith and thus when the desiccant pack 35 is on a drying cycle the relatively cool dry gas discharging through line 19 is conducted through the coil 70a and is passed in heat exchange relationship with the regenerating gas stream which is regenerating the pack 34.

Figure 5:
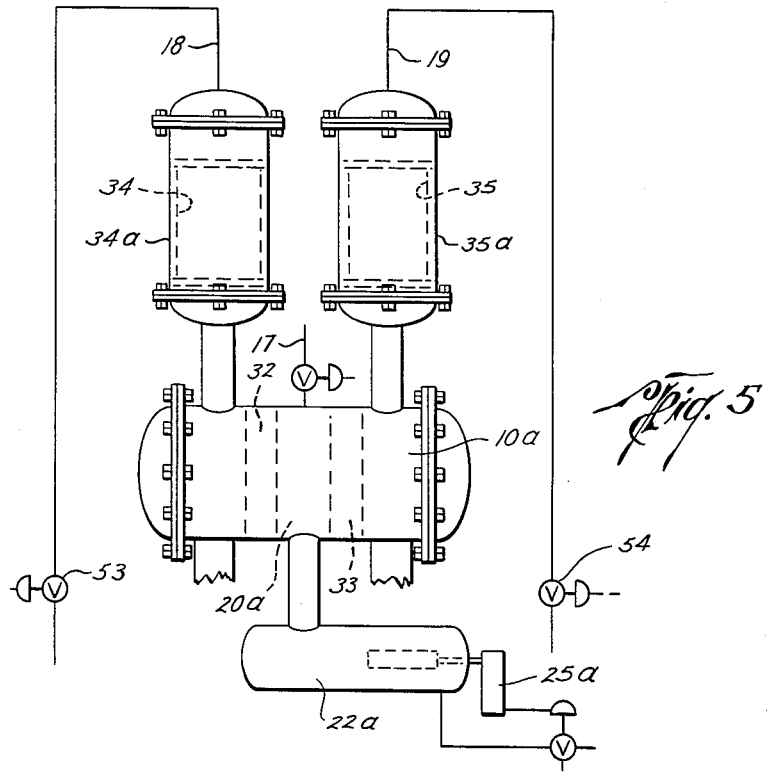
Figure 5 is an elevation showing a modified form of unitary vessel which may be employed in carrying out the invention.

In Figures 1-4 the desiccant packs have been illustrated as mounted in the ends of a horizontal vessel. However, the invention contemplates a unitary vessel structure, such as is illustrated in Figure 5. In this form of the invention a relatively small horizontal vessel 10a is substituted for the vessel 10 and has a central chamber 20a comparable to the inlet chamber of the first form. The coalescing packs 32 and 33 are mounted on each side of the chamber 20a and beyond such coalescing packs a pair of vertical desiccant towers 34a and 35a have communication with the interior of the vessel 10a. The desiccant packs 34 and 35 are mounted in these towers and have the outlet lines 18 and 19 extending therefrom. In lieu of the liquid leg 22 a liquid receiving housing 22a has communication with the chamber 20a and a liquid level controller 25a controls the discharge of liquid from this chamber. The inlet conductor 17 has connection with the chamber 20a.

The operation of this form will be exactly the same as the operation of the form shown in Figures 1-3 heretofore described. The only difference is in the structure so that the desiccant towers are disposed vertically with the desiccant packs mounted therein instead of being mounted in the ends of the main vessel; also in this form a separate liquid receiving housing is provided. The arrangement shown in Figure 5 still provides a relatively small unitary structure which is applicable to well head installations and is also operable under relatively high pressures.

The foregoing disclosure and description of the invention is illustrative and explanatory thereof and various changes in the size, shape and materials, as well as in the details of the illustrated construction may be made, within the scope of the appended claims, without departing from the spirit of the invention.

Having described the invention, I claim:

1. The method of separating liquids and liquid fractions from a gas stream within an apparatus having a double desiccant pack therein, said method including, flowing a main gas stream into a separating chamber between said desiccant packs to remove liquids from said stream, conducting the stream through one of said desiccant packs to remove adsorbable fractions therefrom, discharging the dry gas stream from the apparatus after it has passed through said pack, and simultaneously directing a hot regenerating gas stream through the second desiccant pack to regenerate said second pack, admixing the regenerating gas stream with the incoming main gas stream within the separating chamber between said desiccant packs to effect a heat exchange between the streams to thereby separate liquids from the regenerating stream, and thereafter removing the regenerating gas stream from the apparatus with the main gas stream.

2. The method as set forth in claim 1, together with the additional step of accumulating the liquids which are separated in the separating steps, and thereafter conducting the liquids from the point of accumulation.

3. The method as set forth in claim 1, together with the additional steps of conducting the main gas stream through the regenerated second desiccant pack after the first desiccant pack has become substantially saturated, conducting the hot regenerating gas stream through the substantially saturated first desiccant pack, and admixing the regenerating gas stream after its passage through the substantially saturated desiccant pack with the incoming main gas stream within the separating chamber between said desiccant packs.

4. The method as set forth in claim 1, together with the additional steps of conducting the main gas stream through the regenerated second desiccant pack after the first desiccant pack has become substantially saturated, conducting the hot regenerating gas stream through the substantially saturated first desiccant pack, and admixing the regenerating gas stream after its passage through the substantially saturated desiccant pack with the incoming main gas stream within the separating chamber between said desiccant packs, accumulating the liquids which are separated from the gas streams in the separating steps, and conducting said liquids from the point of accumulation.

5. The method of separating liquids from a gas stream within a single vessel structure having a desiccant pack zone at each end thereof with each desiccant pack zone having a desiccant pack therein, said structure also having a separating zone between said desiccant pack zones and in constant communication therewith, said method including, conducting a main gas stream into the separating zone of said vessel at a point between the packs, separating free liquids from said stream within the vessel structure, then drying the gas stream by directing it through one of said desiccant packs, and simultaneously therewith flowing a hot regenerating gas stream through the second desiccant pack to regenerate the same, the direction of flow of both gas streams being the same longitudinally of the vessel structure.

6. The method of separating liquids from a gas well stream within a single vessel structure having a desiccant pack at each end thereof, said method including, conducting a main gas stream into said vessel structure, separating free liquids from said stream, then drying the gas stream by directing it through one of said desiccant packs, simultaneously therewith flowing a hot regenerating gas stream through the second desiccant pack to regenerate the same, and thereafter intimately contacting and admixing the regenerating gas stream with the main gas stream to effect a condensation of the liquids in the regenerating stream.

7. The method set forth in claim 5, with the additional step of subsequently directing the flow of the main gas stream through the second desiccant pack after the same has been regenerated, and simultaneously therewith directing a regenerating gas stream through the first desiccant pack which was saturated by the drying of the main gas stream.

8. An apparatus for separating liquids and liquid fractions from a gas stream which includes, a unitary vessel assembly having a main gas stream inlet intermediate each outlet end, a desiccant pack disposed between the inlet and each outlet end, an outlet line extending from each outlet end of the vessel assembly whereby a flow of the main gas stream may be selectively directed from the inlet through either one or the other of the desiccant packs to be discharged through the outlet line beyond the desiccant pack, and means for introducing a heated regenerating gas stream into the assembly through the outlet line which is not functioning as a main gas stream outlet whereby one desiccant pack may be undergoing regeneration while the other desiccant pack is adsorbing liquid fractions from the main gas stream.

9. An apparatus as set forth in claim 8, together with a separating chamber within the vessel assembly located between the desiccant packs whereby the incoming main gas stream is mixed with the heated regenerating gas stream after the latter passes through the desiccant pack to cool the regenerating gas stream and thereby condense and precipitate liquids therefrom.

10. An apparatus as set forth in claim 8, together with a separating chamber within the vessel assembly located between the desiccant packs whereby the incoming main gas stream is mixed with the heated regenerating gas stream after the latter passes through the desiccant pack to cool the regenerating gas stream and thereby condense and precipitate liquids therefrom, and a liquid accumulating chamber communicating with the separating chamber for receiving the liquids which precipitate downwardly in said separating chamber.

11. An apparatus as set forth in claim 8, together with means for cooling the regenerating gas stream after it passes through the desiccant pack undergoing regeneration to effect a condensation of liquid fractions in said regenerating stream.

12. An apparatus as set forth in claim 8, together with means for directing the regenerating gas stream after it passes through the desiccant pack undergoing regeneration into contact with the main gas stream to effect a condensation of liquid fractions in said regenerating stream.

13. An apparatus for separating liquids and liquid fractions from a gas stream which includes a unitary vessel assembly having a desiccant pack at each end thereof and a separating chamber formed between said packs, a main gas stream inlet in the vessel assembly communicating with said chamber, a line extending from each end of the vessel assembly whereby a flow of the main gas stream may be conducted from the inlet through either one or the other of said desiccant packs to be discharged through the lines extending from the ends of the vessel assembly, means for directing the flow of the main gas well stream from the inlet through one of the desiccant packs and to the line adjacent said pack, and means for introducing a heated regenerating gas into the opposite end of the vessel assembly to direct a flow of regenerating gas through the second desiccant pack to regenerate said pack while the first pack is effecting a drying of the main gas stream.

14. An apparatus as set forth in claim 13, together with means for contacting the regenerating gas stream with the incoming main gas stream after said regenerating stream has passed through said second desiccant pack, the admixture of the two streams resulting in a condensation and separation of liquids from the regenerating gas stream.

15. An apparatus as set forth in claim 13, together with means for shifting the flow of the main gas stream to direct said stream from the inlet through the second regenerated desiccant pack, and means for simultaneously introducing the heated regenerating gas stream into that end of the vessel adjacent the first desiccant pack which has been saturated by the main gas stream which was directed therethrough in the preceding cycle.

16. An apparatus as set forth in claim 13, together with a liquid accumulating chamber below the separating chamber of the vessel and in communication therewith for receiving the liquid which is separated in said first chamber, and means for discharging the accumulated liquid from said accumulating chamber.

17. An apparatus as set forth in claim 13, together with means for shifting the flow of the main gas stream to direct said stream from the inlet through the second regenerated desiccant pack, and means for simultaneously introducing the heated regenerating gas stream into that end of the vessel adjacent the first desiccant pack which has been saturated by the main gas stream which was directed therethrough in the preceding cycle, said flow shifting means comprising control valves in the inlet conductor and in the lines extending from the vessel and a time cycle controller connected with and controlling operation of the valves, whereby a shift in the direction of flow of the gas streams is made in accordance with a predetermined time lapse.

18. An apparatus as set forth in claim 13, together with means for shifting the flow of the main gas stream to direct said stream from the inlet through the second regenerated desiccant pack, means for simultaneously introducing the heated regenerating gas stream into that end of the vessel adjacent the first desiccant pack which has been saturated by the main gas stream which was directed therethrough in the preceding cycle, said flow shifting means comprising control valves in the inlet conductor and in the lines extending from the vessel, and a time cycle controller connected with and controlling operation of the valves whereby a shift in the direction of the flow of said streams is made in accordance with a predetermined time lapse, and means for maintaining the volume of flow of the heated regenerating gas stream substantially constant.

19. An apparatus for separating liquids and liquid fractions from a gas stream including, a unitary vessel assembly comprising a vessel having a desiccant tower extending upwardly from each end of the vessel and having a liquid receiving chamber depending therefrom, a desiccant pack in each of the towers, an inlet conductor connected to the vessel intermediate the ends thereof, an outlet line extending from each desiccant tower, whereby a flow of the main gas stream may be selectively directed from the inlet through either one or the other of the desiccant packs to be discharged through the outlet line beyond the desiccant packs, and means for introducing heated regenerating gas stream into the assembly through the outlet line which is not functioning as a main gas stream outlet whereby one desiccant pack may be undergoing regeneration while the other desiccant pack is adsorbing liquid fractions from the main gas stream.

20. An apparatus as set forth in claim 19, wherein the vessel functions as a separating chamber which is located between the desiccant packs whereby the incoming main gas stream is mixed with the heated regenerating gas stream to cool the latter after it has passed through the desiccant pack, the vessel having communication with the liquid receiving chamber whereby liquid fractions condensed in said separating chamber may precipitate into the liquid receiving chamber.

21. The method as set forth in claim 1, together with the additional step of cooling the regenerating gas stream subsequent to its passage through the second pack and prior to its admixture with the main gas stream within the separating chamber.

22. The method as set forth in claim 6, together with the additional step of cooling the regenerating gas stream subsequent to its passage through said second desiccant pack and prior to its admixture with the main gas stream.

23. An apparatus as set forth in claim 13, together with means for admixing the regenerating gas stream with the incoming main stream within the separating chamber after said regenerating stream has passed through said second desiccant pack, and means disposed between the second desiccant pack and the separating chamber for extracting heat from the regenerating gas prior to its passage to its admixture with the main gas stream.

24. The method of separating liquids and adsorbable fractions from a gas stream including, flowing a main gas stream into a separating chamber to remove liquids from the stream, thereafter conducting the stream through a first adsorbing zone which is in constant uninterrupted communication with the separating chamber to remove adsorbable fractions therefrom, discharging the dry gas stream from the first adsorbing zone, simultaneously directing a heated regenerating gas stream through a second adsorbing zone to regenerate the adsorbent material in said second zone, said second zone being in constant uninterrupted communication with the separating chamber and through said separating chamber in constant communication with the first adsorbing zone, then admixing the regenerating gas stream after its passage through the second adsorbing zone with the main gas stream within the separating chamber to effect a heat exchange between the streams, withdrawing liquids which have been removed from the streams from the separating chamber, and thereafter flowing the regenerating gas stream through the first adsorbing zone with the main gas stream.

25. The method as set forth in claim 24, together with the additional step of cooling the regenerating gas stream after its passage through said second adsorbing zone and prior to its passage into the separating chamber.

26. The method as set forth in claim 24, together with the additional steps of conducting the main gas stream through the regenerated second adsorbing zone after the material in the first adsorbing zone has become saturated, conducting the heated regenerating gas stream through the saturated first adsorbing zone, and admixing the regenerating gas stream after its passage through the saturated first adsorbing zone with the incoming main gas stream within the separating chamber.

27. An apparatus for separating liquids and liquid fractions from a gas stream including, a unitary vessel assembly having a first adsorbing zone and a second adsorbing zone, said first and second adsorbing zones being in constant communication with each other through a separating chamber, means for conducting a main gas stream into the separating chamber and then through the first adsorbing zone to remove adsorbable fractions from the main stream, means for simultaneously conducting a heated regenerating gas through the second adsorbing zone to re-activate said second zone, and means for directing the heated regenerating gas into the separating chamber to admix said regenerating gas with the incoming main gas stream to effect a heat exchange between the streams, said regenerating stream then flowing through the first adsorbing zone with the main gas stream.

28. An apparatus as set forth in claim 27, together with means disposed between said second adsorbing zone and the separating chamber for extracting heat from the regenerating gas stream after it has passed through the second adsorbing zone and prior to its admixture with the main gas stream.

29. An apparatus as set forth in claim 27, together with means for shifting the flow of the main gas stream to direct said stream from the separating chamber to the second adsorbing zone which has been re-activated, and means for simultaneously directing the heated regenerating gas stream through the first adsorbing zone to effect a re-activation thereof.

30. An apparatus as set forth in claim 27, together with means for splitting off a portion of the main gas stream to form a regenerating gas stream, a heater for heating said regeneration disposed in advance of said second adsorbing zone, and means for maintaining the volume of the regeneration gas stream substantially constant.

31. The method of separating liquids and adsorbable fractions from a gas stream including, dividing the stream into a major gas stream and a minor gas stream, flowing the major stream into a chamber to separate liquids therefrom, thereafter conducting the major stream through a first adsorbing zone which is in constant uninterrupted communication with the separating chamber to remove adsorbable fractions therefrom, discharging the dry gas stream from the first adsorbing zone, simultaneously heating the minor stream to form a regenerating gas stream and directing the same through a second adsorbing zone which requires regeneration to re-activate the same, said second zone being in constant uninterrupted communication with the first adsorbing zone through the separating chamber, then admixing the minor stream with the major stream within the separating chamber to effect a heat exchange therebetween, and thereafter flowing the minor stream through the first adsorbing zone with the major stream.

32. The method as set forth in claim 31, together with the additional step of maintaining the volume of the minor stream substantially constant.

33. The method as set forth in claim 31, together with the additional step of cooling the minor regeneration gas stream after it has traversed the second adsorbing zone and prior to its admixture with the major gas stream.

References Cited in the file of this patent

UNITED STATES PATENTS

| | | |
|---|---|---|
| 1,522,111 | Franck-Philpson | Jan. 6, 1925 |
| 1,924,849 | Fonda | Aug. 29, 1933 |
| 1,948,779 | Abbott et al. | Feb. 27, 1934 |
| 2,504,184 | Dawson | Apr. 18, 1950 |
| 2,621,752 | Riley | Dec. 16, 1952 |
| 2,629,460 | Maki | Feb. 24, 1953 |
| 2,663,626 | Spangler | Dec. 22, 1953 |
| 2,665,769 | Walker et al. | Jan. 12, 1954 |